(12) United States Patent
Fukutomi et al.

(10) Patent No.: US 7,513,163 B2
(45) Date of Patent: Apr. 7, 2009

(54) PRESSURE SENSOR AND DEVICE FOR MEASURING PRESSURE

(75) Inventors: Hiroyuki Fukutomi, Tokyo (JP); Takashi Ogata, Tokyo (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 11/695,768

(22) Filed: Apr. 3, 2007

(65) Prior Publication Data
US 2007/0204698 A1    Sep. 6, 2007

(51) Int. Cl.
*G01L 7/00* (2006.01)
(52) U.S. Cl. .......................................... 73/714; 73/717
(58) Field of Classification Search .......... 73/700–756; 361/283.1–283.4
See application file for complete search history.

(56) References Cited

U.S. PATENT DOCUMENTS

| | | | | |
|---|---|---|---|---|
| 6,501,067 B2 * | 12/2002 | Jones et al. | ............. | 250/227.14 |
| 6,593,841 B1 * | 7/2003 | Mizoguchi et al. | .......... | 336/200 |
| 6,880,404 B2 * | 4/2005 | Uberreiter | .................... | 73/706 |
| 6,960,911 B2 * | 11/2005 | Inoue | ......................... | 324/209 |

FOREIGN PATENT DOCUMENTS

| | | | |
|---|---|---|---|
| EP | 1 698 674 A1 | 9/2006 | |
| JP | 6-46171 | 6/1994 | |
| JP | 7-139991 | 6/1995 | |
| JP | 10-318865 | 12/1998 | |
| JP | 3089455 | 7/2000 | |
| JP | 2000-346606 | 12/2000 | |
| JP | 2003-337071 | 11/2003 | |
| JP | 2004-333339 | 11/2004 | |
| JP | 3645553 | 2/2005 | |
| JP | 2005-156474 | 6/2005 | |

* cited by examiner

*Primary Examiner*—Andre J Allen
*Assistant Examiner*—Jermaine Jenkins
(74) *Attorney, Agent, or Firm*—Oblon, Spivak, McClelland, Maier & Neustadt, P.C.

(57) ABSTRACT

A pressure sensor and a pressure measuring device are provided applicable to a variety of pressure detection targets and capable of measuring a surface pressure. The pressure sensor is configured by laminating a metal layer made of a metal film, an elastic member layer made of a non-metal material, and a coil layer including an exciting coil. Also, as for a sensor sheet on which sensors that each measure point pressure are arranged in an array, variable elements of the elastic member layer and the coil layer are appropriately changed, thereby forming sensors with a single sheet that are different in pressure detection accuracy or pressure detection range for predetermined areas. Also provided is a pressure measuring device that controls exciting timing or frequency of applied voltage of each exciting coil on a sensor sheet.

11 Claims, 9 Drawing Sheets

PRESSURE

METAL LAYER
(METAL FILM)
1a

ELASTIC MEMBER LAYER
1b

COIL LAYER
1c

WIRINGS

EXCITING COIL
2

FIG.4

| SENSOR CONFIGURING LAYER | VARIABLE ELEMENT |
|---|---|
| ELASTIC MEMBER LAYER | ELASTIC MODULUS |
| COIL LAYER | THE NUMBER OF TURNS |
| | DIAMETER |
| | SHAPE |

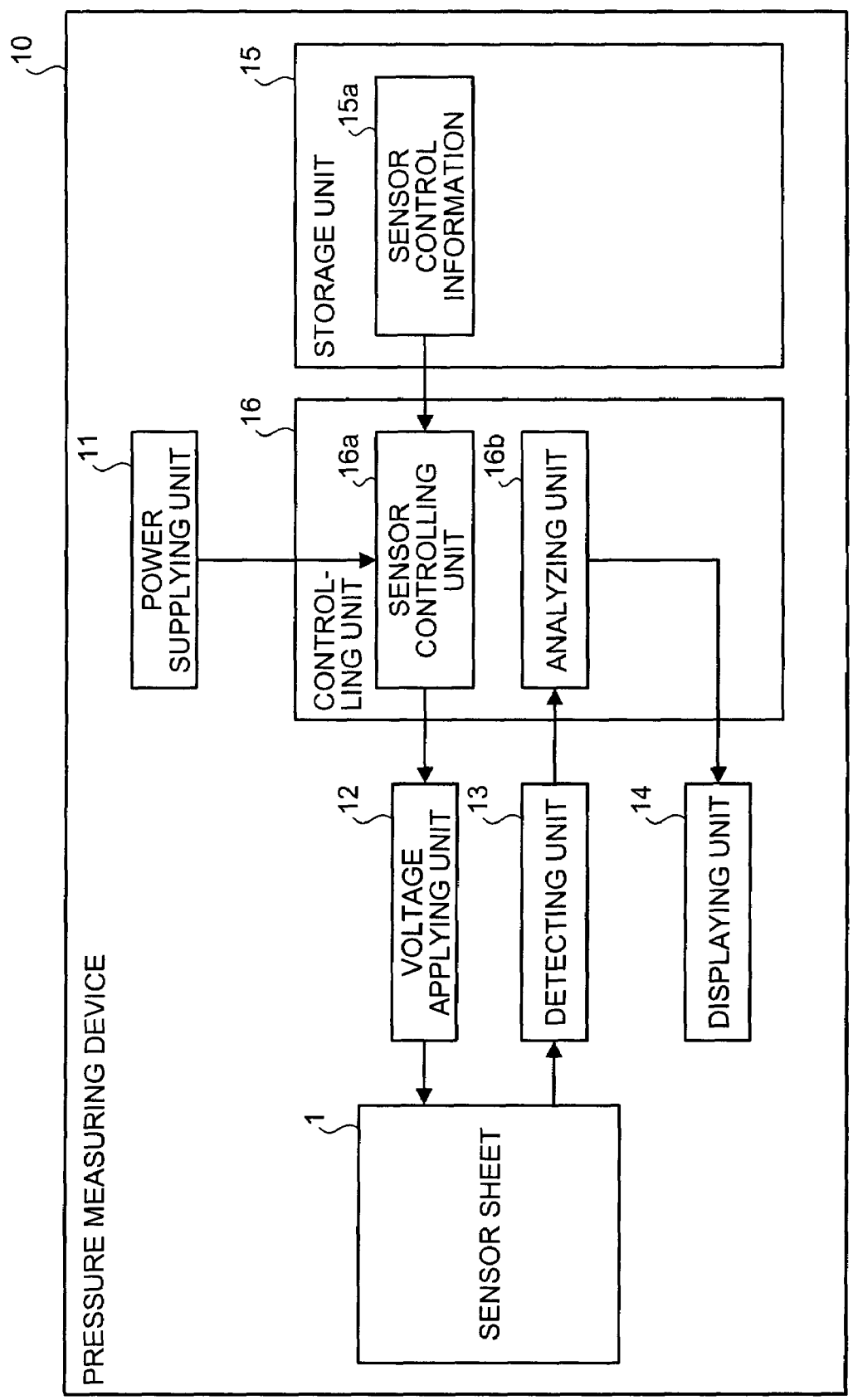

FIG.9

| COIL NUMBER | FREQUENCY |
|---|---|
| A1 ~ A2 | XX Hz |
| B1 ~ B2 | |
| C1 ~ C2 | |
| D1 ~ D2 | |
| A3 ~ A4 | YY Hz |
| B3 ~ B4 | |
| C3 ~ C4 | |
| D3 ~ D4 | |
| ⋮ | ⋮ |

FIG.10

| MOUNTING TARGET | MEASUREMENT TARGET |
|---|---|
| MEDICAL BED | SURFACE PRESSURE OF PERSON |
| SHOES | SURFACE PRESSURE OF FOOT |
| WIPER | SURFACE PRESSURE BY WINDSHIELD |
| WINDSHIELD | SURFACE PRESSURE BY WIPER |
| CONSTRUCTIONAL MATERIAL | SURFACE PRESSURE BY ANOTHER CONSTRUCTIONAL MATERIAL |
| ⋮ | ⋮ |

PRESSURE SENSOR AND DEVICE FOR MEASURING PRESSURE

BACKGROUND OF THE INVENTION

1. Field of the Invention

The present invention relates to pressure sensors and devices for measuring pressure, and, more particularly, to a pressure sensor and a device for measuring pressure using this pressure sensor capable of flexibly supporting the shape or size of a mounting target or a pressure detection target and also capable of accurately detecting surface pressure of a pressure detection target.

2. Description of the Related Art

Conventionally, pressure sensors that detect pressure by converting applied pressure to an electrical signal have been known. Some of such pressure sensors detect pressure by using an elastic member such as a rubber as a component therein, utilizing the deformation of the elastic member by pressure.

For example, Patent Document 1 (Japanese Patent Application Laid-Open Publication No. 10-318865) discloses a pressure sensor in which an elastic member containing metal powders admixed therein and an exciting coil are disposed adjacently to each other. Being in a state that a voltage is applied to the exciting coil, the pressure sensor detects pressure as a loss of an eddy-current which occurs upon application of a load to the elastic member.

Also, Patent Document 2 (Japanese Patent Application Laid-Open Publication No. 2000-346606) discloses a pressure sensor in which an elastic member is provided between a permanent magnet and a hall element. This pressure sensor detects applied pressure based on a change in eddy current which occurs upon application of a load to the elastic member.

However, the technology disclosed in Patent Document 1 has a problem in which pressure detection accuracy depends to a large degree on the quality of the elastic member containing the metal powders. That is, upon preparing the pressure sensor, distribution density of the metal powders to be mixed into the elastic member is required to be accurately controlled. Therefore there is a problem of low yields of sufficiently accurate pressure sensors.

The technology disclosed in Patent Document 2 has a problem in limitation of size reduction of the permanent magnet. Therefore this sensor can not be adapted to small pressure detection targets. For this reason, this pressure sensor is not suitable for the purpose of measuring surface pressure with discrete pressure sensors being arranged in an array. Furthermore, there is also a limitation in increasing size of the hall element, and therefore this sensor cannot be adapted to large pressure detection targets.

From those mentioned above, there is a major demand in realizing a pressure sensor that is applicable to a variety of pressure detection targets, capable of accurately measuring pressure, capable of being readily arranged in an array, and capable of efficiently measuring surface pressure.

SUMMARY OF THE INVENTION

The present invention is to solve the problems in the conventional technology described above, and an object of the present invention is to provide a pressure sensor that is applicable to a variety of pressure detection targets, capable of accurately measuring pressure, capable of being readily arranged in an array, and capable of efficiently measuring surface pressure, as well as to provide a device for measuring pressure using this pressure sensor.

According to the present invention, the following are provided:

(1) A pressure sensor comprising: a coil layer including an exciting coil; an elastic member layer made of a non-metal material provided adjacently to the coil layer; and a metal layer made of a metal film provided adjacently to the elastic member layer, the coil layer, the elastic member layer and the metal layer being laminated together, wherein a pressure applied to the metal layer is detected based on a change in an eddy current induced by the exciting coil on the metal film.

(2) The pressure sensor according to the above, wherein the coil layer includes a plurality of the exciting coils arranged in an array, and a surface pressure applied to the metal layer is detected.

(3) The pressure sensor according to the above, wherein the coil layer has a plurality of the exiting coils, wherein number of turns, diameter or both of the exiting coils varies per each predetermined area.

(4) The pressure sensor according to the above, wherein the elastic member layer is made of a non-metal materials, wherein elastic modulus of the material varies per each predetermined area.

(5) The pressure sensor according to the above, wherein the elastic member layer is made of polyurethane.

(6) The pressure sensor according to the above, wherein the coil layer, the elastic member layer, and the metal layer have flexibility applicable to a measurement target or a mounting target.

(7) A pressure measuring device comprising: a pressure sensor formed by laminating a coil layer including a plurality of exciting coils arranged in an array; an elastic member layer made of a non-metal material provided adjacently to the coil layer; and a metal layer made of a metal film provided adjacently to the elastic member layer, and a voltage applying unit that applies a voltage to each exciting coil of the pressure sensor with predetermined time differences.

(8) The pressure measuring device according to the above, wherein the coil layer of the pressure sensor includes a plurality of the exciting coils having different number of turns, diameter or both.

(9) The pressure measuring device according to the above, wherein the elastic member layer of the pressure sensor is made of non-metal materials, wherein elastic modulus of the material varies per each predetermined area.

(10) The pressure measuring device according to the above, wherein voltages of frequencies are applied to the exciting coils, wherein the voltages vary depending on predetermined areas to which the coils are provided.

According to the invention of (1) above, a pressure sensor includes a coil layer including an exciting coil; an elastic member layer made of a non-metal material provided adjacently to the coil layer; and a metal layer made of a metal film provided adjacently to the elastic member layer, the coil layer, the elastic member layer, and the metal layer being laminated together, and a pressure applied to the metal layer is detected based on a change in an eddy current induced by the exciting coil on the metal film. Therefore, the present invention enables to provide a pressure sensor that is applicable to a variety of pressure detection targets, capable of accurately measuring pressure, capable of being readily arranged in an array, and capable of efficiently measuring surface pressure.

According to the invention of (2) above, the coil layer includes a plurality of the exciting coils arranged in an array, and a surface pressure applied to the metal layer is detected. With this, an effect can be achieved such that a surface pressure of a measurement target can be measured with the same laminating structure as that of a sensor for measuring point pressure, and this pressure sensor can be applied to various measurement targets, from large to small targets.

According to the invention of (3) above, the coil layer has a plurality of the exiting coils whose number of turns, diameter, or both varies per each predetermined area. With this, an effect can be achieved such that exciting coils of different specifications are arranged, thereby allowing sensor detection sensitivity to be appropriately altered per each area on a single sensor sheet.

According to the invention of (4) above, the elastic member layer is made of non-metal materials whose elastic modulus varies per each predetermined area. With this, an effect can be achieved such that sensor detection sensitivity can be appropriately altered per each area on a single sensor sheet by arranging elastic members adjacently with different elastic moduli or using an elastic member with each different elastic modulus for each area.

According to the invention of (5) above, the elastic member layer is made of polyurethane. With this, an effect can be achieved such that a sensor with high manufacturing accuracy can be easily produced with low manufacturing cost.

According to the invention of (6) above, the coil layer, the elastic member layer, and the metal layer have flexibility applicable to a measurement target or a mounting target. With this, an effect can be achieved such that, surface pressure can be accurately measured even when the surface of a measurement target or a mounting target has a curved shape.

According to the invention of (7) above, the pressure measuring device includes a pressure sensor formed by laminating a coil layer including a plurality of exciting coils arranged in an array; an elastic member layer made of a non-metal material provided adjacently to the coil layer; and a metal layer made of a metal film provided adjacently to the elastic member layer, and a voltage applying unit that applies a voltage to each exciting coil of the pressure sensor with predetermined time differences. Therefore, various pressure targets can be supported, and pressure can be accurately measured. Also, an effect can be achieved such that excitation of the exciting coils arranged in an array is subjected to excitation control, thereby providing a pressure measuring device capable of suppressing interference among the exciting coils and accurately measuring surface pressure.

According to the invention of (8) above, the coil layer of the pressure sensor includes a plurality of the exciting coils whose number of turns, diameter or both. With this, an effect can be achieved such that exciting coils of different specifications are arranged, thereby allowing sensor detection sensitivity to be appropriately changed for each area on a single sensor sheet.

According to the invention of (9) above, the elastic member layer of the pressure sensor is made of non-metal materials whose elastic modulus varies per each predetermined area. With this, an effect can be achieved such that sensor detection sensitivity can be appropriately altered per each area on a single sensor sheet by arranging elastic members with different elastic moduli or using an elastic member with each different elastic modulus for each area.

According to the invention of (10) above, the voltage applying unit applies voltages to the exciting coils, the frequency of which varies depending on predetermined areas to which the coils are provided. With this, an effect can be achieved such that sensor detection sensitivity can be appropriately altered per each area on a single sensor sheet even when the properties of every area on the sensor sheet are made homogeneous.

The above and other objects, features, advantages of the present invention will be clarified from the following detailed description of the invention by using the drawings.

BRIEF DESCRIPTION OF THE DRAWINGS

FIG. 4 is a table listing variable elements of the pressure sensor.

FIG. 6 is a block diagram depicting the configuration of a pressure measuring device according to the second embodiment.

FIG. 9 is a table listing examples of voltage frequencies applied to the exciting coils.

FIG. 10 is a table listing examples of measurement targets of the pressure sensor and the pressure measuring device.

DETAILED DESCRIPTION

With reference to the attached drawings, embodiments of the pressure sensor and the pressure measuring device using this pressure sensor will be described in detail hereinbelow. In the following, the pressure sensor according to the present invention is described in a first embodiment, whilst the pressure measuring device using the pressure sensor according to the present invention is described in a second embodiment.

FIRST EMBODIMENT

Figure 1A:
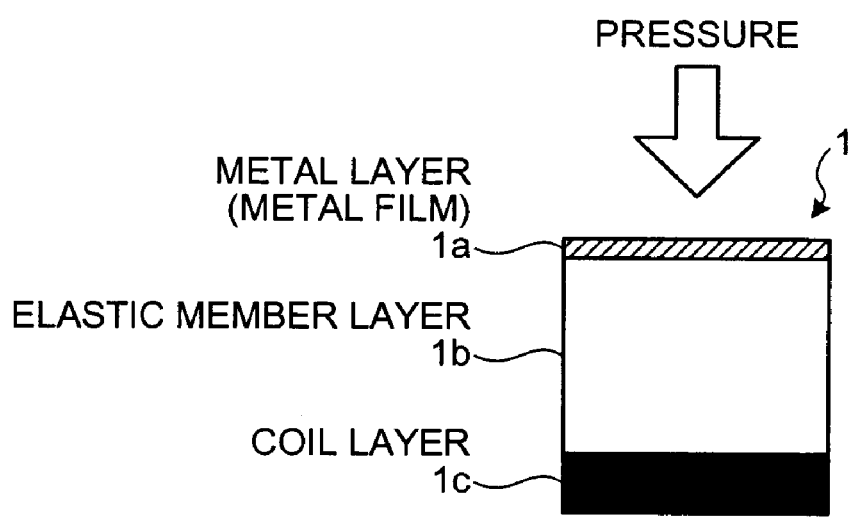
FIG. 1 is a view depicting the configuration of a pressure sensor according to the first embodiment.
Figure 1B:
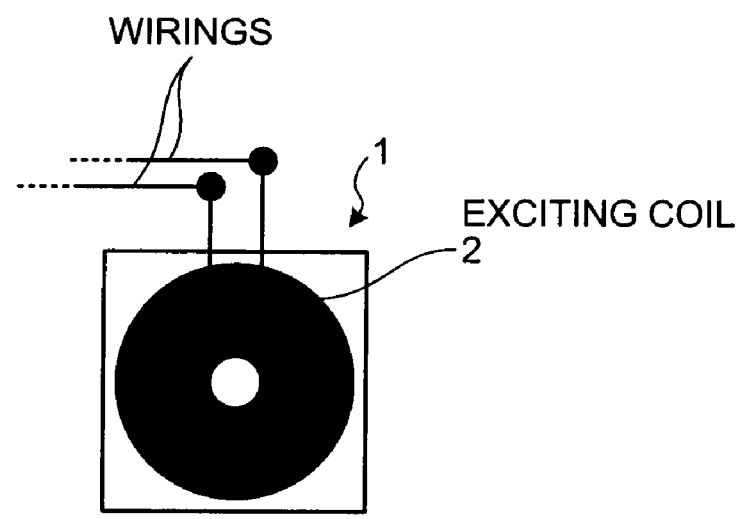

First, the configuration of the pressure sensor according to the first embodiment will be described. FIG. 1 is a drawing depicting the configuration of the pressure sensor of the first embodiment. FIG. 1A is a side view of a pressure sensor 1, and FIG. 1B is a top view of the pressure sensor 1. In FIG. 1B, a metal layer 1$a$ and an elastic member layer 1$b$ are omitted.

As depicted in FIG. 1A, the pressure sensor 1 is formed by laminating a metal layer made of a metal film, an elastic member layer made of a non-metal material, such as polyurethane, and a coil layer including an exciting coil.

Also, as depicted in FIG. 1B, a coil layer 1$c$ of the pressure sensor 1 is provided with an exciting coil 2 and wirings connected to each end of this exciting coil 2. For such wirings, a printed board is used for example. With the exciting coil 2 being interposed between a layer of the printed board connected to one end of the exciting coil 2 and another layer of the printed board connected to the other end of the exciting coil 2, the coil layer 1$c$ is formed.

In this pressure sensor 1, a voltage is applied to the exciting coil 2 of the coil layer 1$c$ via the aforementioned wirings to induce an eddy current in a metal layer 1$a$. Then, when a pressure is applied from a metal layer 1$a$ side to cause deformation of the elastic member layer 1$b$, the distance between the metal layer 1$a$ and the coil layer 1$c$ is changed, and a resistance value of the exciting coil 2 is changed accordingly.

Therefore, by obtaining an amount of change in this resistance value or an amount of change in current via the aforementioned wirings, the pressure can be measured.

Meanwhile, in some conventional pressure sensors, an elastic member in which metal powders are mixed and an exciting coil are arranged adjacently to each other. In such pressure sensors, with a voltage being applied to the exciting coil, a pressure is detected from a loss in eddy current occurring when a load is applied to the elastic member. However, with the elastic member containing metal powders, it is required to manufacture an elastic member with the distribution density of metal powders being accurately controlled. Therefore, there has been a problem in which unevenness in distribution density may degrade the accuracy of the pressure sensor.

Some of other conventional pressure sensors are provided with an elastic member between a permanent magnet and a hall element. Such pressure sensors detect a pressure applied based on changes in eddy current occurring when a load is applied to the elastic member. However, there is a limitation for sufficiently downsizing the permanent magnet, and these pressure sensors are not suitable for disposing in an array to measure a surface pressure. In addition, there is also a limitation for sufficiently upsizing the hall element. Thus there has been a difficulty in application of such pressure sensors to measurement of a large object.

In order to address the aforementioned problems, in the pressure sensor 1 according to the first embodiment, the elastic member 1b made of a non-metal material has provided on its upper surface a metal film (metal layer 1a) and on its lower surface the coil layer 1c including the exciting coil 2. In this manner, a sensor can be formed by laminating layers, thereby reducing manufacturing cost and easily manufacturing the pressure sensor 1 with uniform properties.

Also, in this pressure sensor 1, the diameter of the exciting coil 2 included in the coil layer 1c can be decreased to approximately 1 mm. Therefore, the pressure sensor 1 can support a small measurement target. In this manner, since the size of the exciting coil 2 can be sufficiently decreased, the exciting coils 2 can be easily arranged in an array. Therefore, the pressure sensor 1 is suitable also for the purpose of detecting a surface pressure of a measurement target.

Figure 2A:
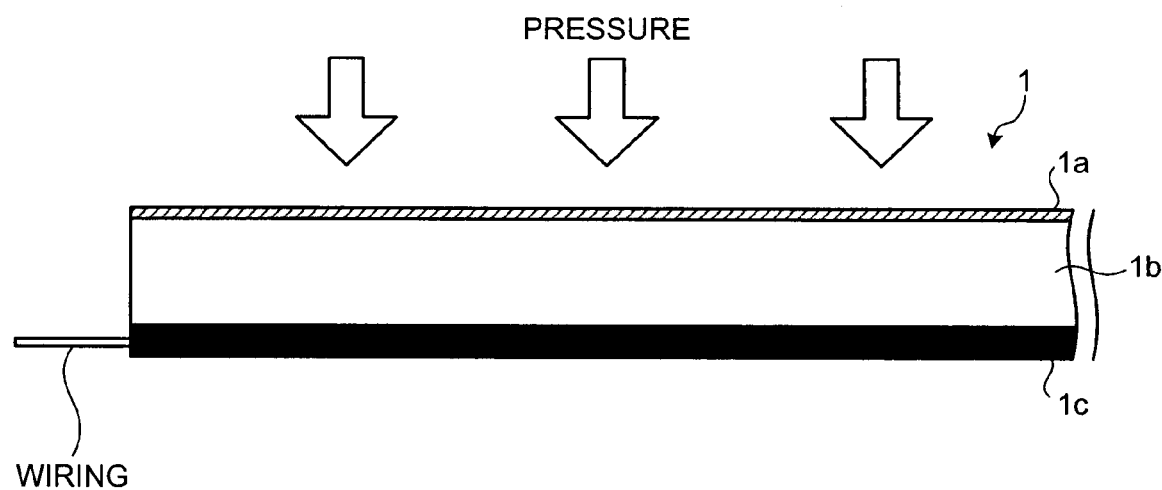
FIG. 2 is a view depicting a pressure sensor with exciting coils being arranged in an array.
Figure 2B:
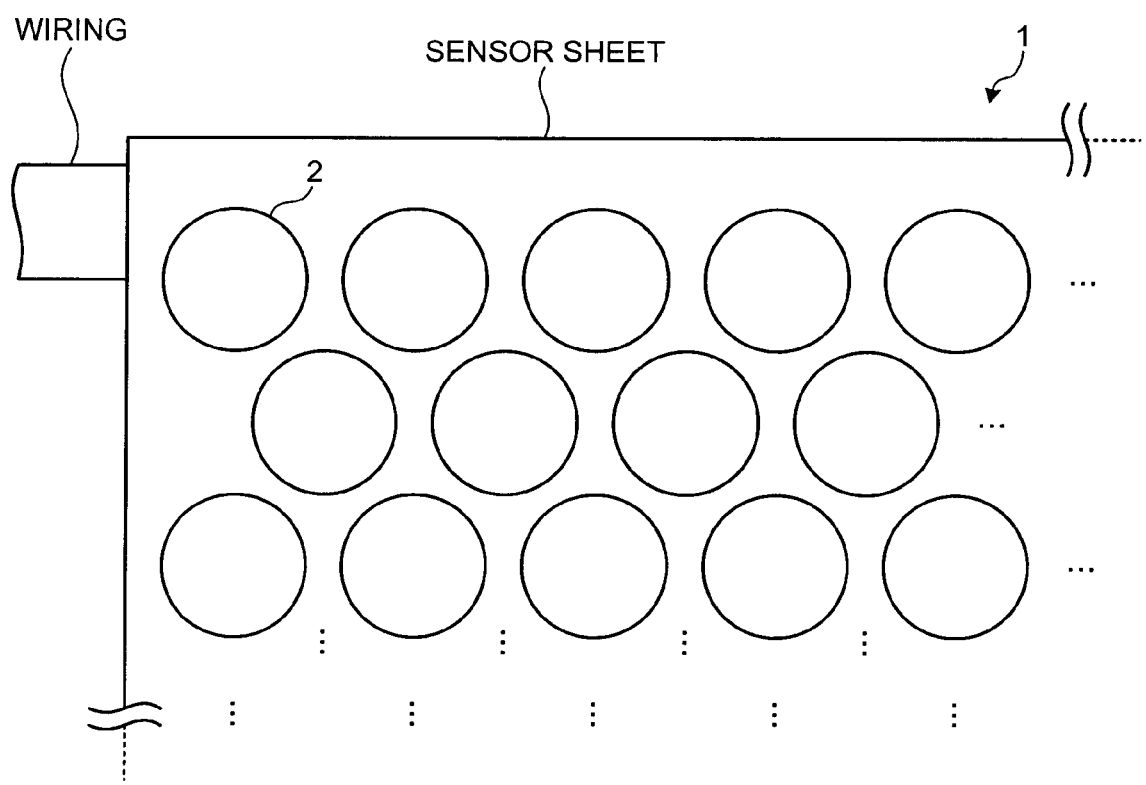

Next, a pressure sensor 1 with exciting coils 2 being arranged in an array will be described referring to FIG. 2. FIG. 2 is a drawing of a pressure sensor 1 with the exciting coils 2 being arranged in an array (this pressure sensor is hereinafter referred to as a "sensor sheet"). FIG. 2A is a side view of the sensor sheet 1, and FIG. 2B is a top view of the sensor sheet 1. In FIG. 2B, a metal layer 1a and an elastic member layer 1b are omitted.

As depicted in FIG. 2A, even when the exciting coils 2 are arranged in an array, the layer configuration of the sensor sheet 1 is the same as that of the pressure sensor 1 depicted in FIG. 1A. As such, the pressure sensor 1 according to the first embodiment is flexibly applicable to measurement of point pressure as well as a surface pressure with the same layer configuration.

Also, as depicted in FIG. 2B, the sensor sheet 1 has a coil layer 1c on which the exciting coils 2 are arranged in an array. As with the case of FIG. 1, wirings connected to each exciting coil 2 are formed by a printed board or the like. Although it is mentioned in the above that the diameter of the exciting coil 2 can be decreased to approximately 1 mm, the diameter of the exciting coil 2 can be increased to approximately several centimeters. Therefore, the sensor sheet 1 can also be applied to a large measurement target. Furthermore, the thickness of the sensor sheet 1 can be decreased to approximately 1 mm. Therefore, the sensor sheet 1 itself can be flexible.

Figure 3A:
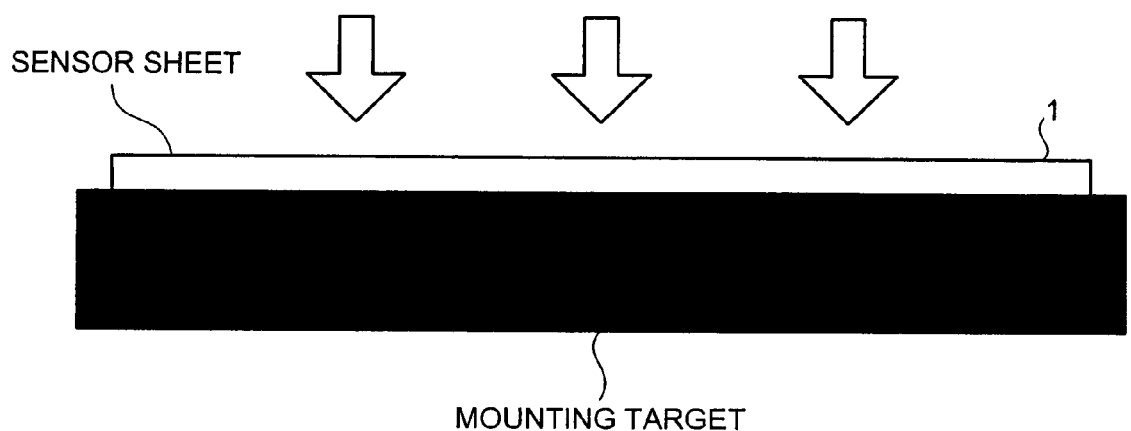
FIG. 3 is a view depicting flexibility of a sensor sheet.
Figure 3B:
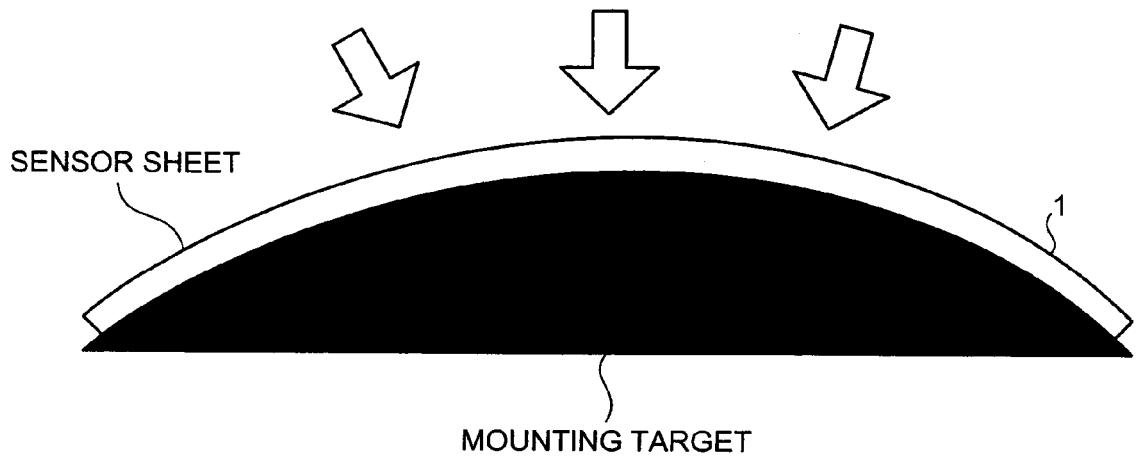
Figure 3C:
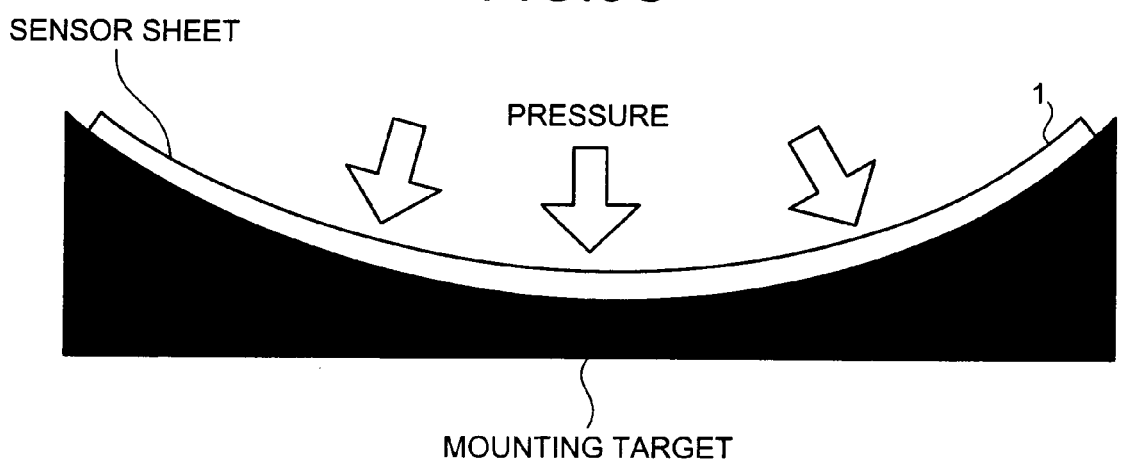

Next, the flexibility of the sensor sheet 1 will be described by using FIG. 3. FIG. 3 is a drawing depicting flexibility of the sensor sheet 1. FIG. 3A depicts a case where the sensor sheet 1 is applied to a mounting target having a flat surface, while FIGS. 3B and 3C depict a case where the sensor sheet 1 is applied to a mounting target having a curved surface.

As depicted in FIG. 3, since the sensor sheet 1 is formed by laminating the metal layer 1a, the elastic member layer 1b, and the coil layer 1c, the sensor sheet 1 has flexibility. Therefore, when the mounting surface is flat or even curved, the sensor sheet 1 can be placed so as to have a close contact with the surface of the mounting target.

Furthermore, it is possible to configure the sensor sheet 1 with properties of the elastic member layer 1b or the coil layer 1c being altered per each predetermined area. With this, the configuration can be such that the sensitivity of the sensor is increased for an area on which detection of pressure distribution is desired to be in detail, whilst the sensitivity of the sensor is decreased for an area on which detection of pressure distribution is not necessary to be in detail.

Next, variable elements regarding the detection sensitivity of the pressure sensor 1 will be described with reference to FIG. 4. FIG. 4 is a table listing the variable elements of the pressure sensor 1. For example, as listed in the table, as for the elastic member layer 1b, by altering the composition of polyurethane forming the elastic member layer 1b or the degree of forming, an elastic modulus for each predetermined area can be altered.

Also, as for the coil layer 1c, the number of turns, diameter, or shape of the exciting coil 2 included in the coil layer 1c can be changed per each predetermined area. For example, for an area where sensor sensitivity is desired to be increased, an exciting coil 2 with a large number of turns is provided. For an area where a rough surface pressure is desired to be measured, an exciting coil 2 having a large diameter is provided. Also, the exciting coil 2 provided is not necessarily a circular coil, but can have a shape adapted to a measurement target or a mounting target, such as an oval or rectangular shape.

In this manner, the variable elements can be changed for each predetermined area on the pressure sensor (sensor sheet) 1, thereby forming the pressure sensor (sensor sheet) 1 capable of flexibly supporting the accuracy of the pressure to be detected and the density of the pressure distribution to be detected. The sensor sheet 1 with pressure detection accuracy in the sheet being altered by using the variable elements will be described with reference to FIG. 5. FIG. 5 is a drawing of the sensor sheet 1 with altered pressure detection accuracy per each predetermined area.

Figure 5A:
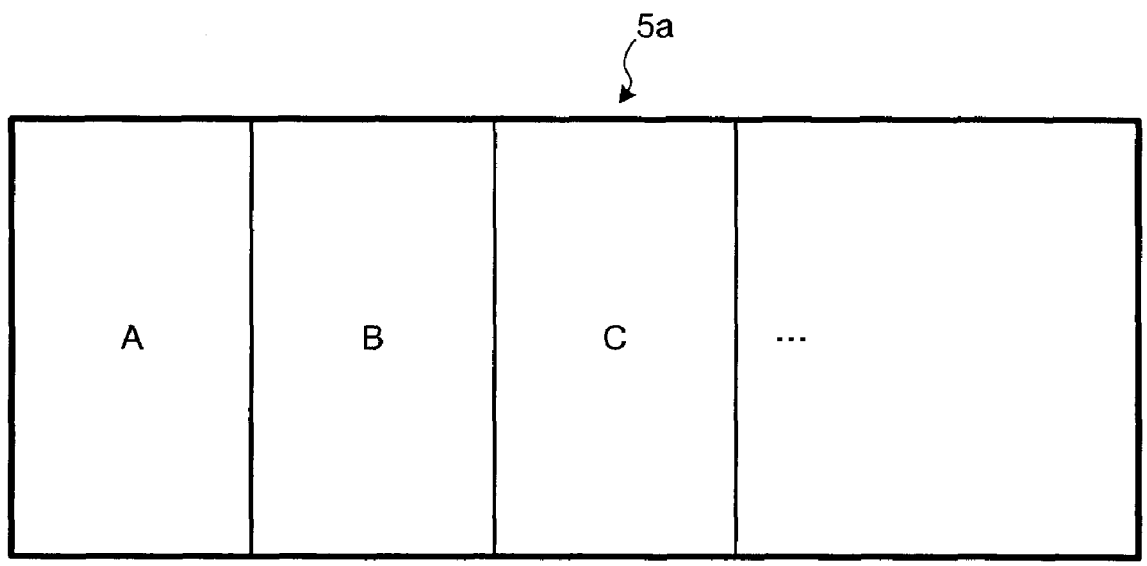
FIG. 5 is a view depicting a sensor sheet with altered pressure detection accuracy per each predetermined area.
Figure 5B:
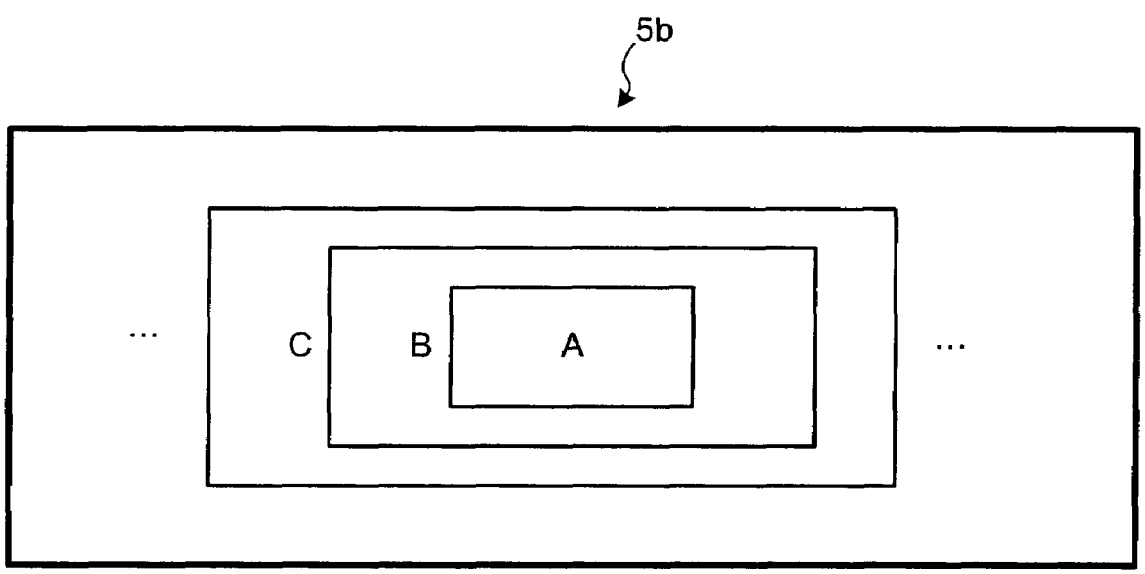

For example, in a pattern 5a depicted in FIG. 5A and a pattern 5b depicted in FIG. 5B, the pressure detection accuracy may be altered per each area (refer to "A", "B", or "C" in each drawing). The drawings depict the case where each area on the sensor sheet 1 has a rectangular shape, but this is not meant to be restrictive. Each area may have a circular shape or an arbitrary shape.

As described above, in the first embodiment, the pressure sensor is configured by laminating a metal layer made of a metal film, an elastic member layer made of a non-metal material, and a coil layer including an exciting coil. Therefore, a pressure sensor that measures point pressure and a pressure sensor that measures surface pressure can be achieved by a similar layer configuration. In addition, because of wide degree of allowance of size selection of the exciting coil, the pressure sensor can be applied to pressure detection targets of a variety of sizes.

Also, in the sensor sheet having sensors each of which measures point pressure are arranged in an array, the variable elements of the elastic member layer or the coil layer are appropriately altered, to thereby configure a single sheet having sensors of different pressure detection accuracies and different pressure detection ranges per predetermined areas. Furthermore, since the sensor sheet with a layer configuration has flexibility, the sensor sheet is widely applicable to mounting targets and measurement targets of a variety of shapes.

In the following second embodiment, a pressure measuring device 10 using the pressure sensor (sensor sheet) 1 described in the first embodiment will be described.

SECOND EMBODIMENT

First, the configuration of the pressure measuring device 10 using the sensor sheet 1 depicted in the first embodiment will be described by using FIG. 6. FIG. 6 is a block diagram of the configuration of the pressure measuring device 10 according to the second embodiment. As depicted in the drawing, the pressure measuring device 10 includes the sensor sheet 1, a power supplying unit 11, a voltage applying unit 12, a detecting unit 13, a displaying unit 14, a storage unit 15, and a controlling unit 16. Also, the storage unit 15 has sensor control information 15a stored therein, and the controlling unit 16 further includes a sensor controlling unit 16a and an analyzing unit 16b.

The sensor sheet 1 is as depicted in the first embodiment described above. This sensor sheet 1 is connected to the voltage applying unit 12 and the detecting unit 13 via the wirings described above (refer to FIG. 2). The power supplying unit 11 is a device that supplies power for activating the pressure measuring device 10. In the second embodiment, the pressure measuring device 10 with the power supplying unit 11 is depicted. Alternatively, the pressure measuring device 10 can be configured so as to receive supply of power from an external power supplying device.

The voltage applying unit 12 is a device that applies voltage to each exciting coil 2 on the sensor sheet 1 in accordance with instructions from the sensor controlling unit 16a of the controlling unit 16. Also, the detecting unit 13 is a device that measures a current or resistance of each exciting coil 2 to which voltage is being applied, and passes the measurement results to the analyzing unit 16b of the controlling unit 16.

The displaying unit 14 is a display device that displays data, such as surface pressure distribution, which are output from the analyzing unit 16b of the controlling unit 16 by using characters and graphs. The data to be output to the displaying unit 14 may be stored in the storage unit 15 and the progress of the pressure distribution with time may be graphically displayed.

The storage unit 15 is a storage device, such as a hard disk or RAM (Random Access memory), and has the sensor control information 15a stored therein for controlling each exciting coil 2 on the sensor sheet 1. The sensor control information 15a will be described in detail further below with reference to FIGS. 8 and 9.

The controlling unit 16 is a processing unit that controls voltage application of the voltage applying unit 12 to each exciting coil 2 on the sensor sheet 1, based on the sensor control information 15a in the storage unit 15. Also, this controlling unit 16 is also a processing unit that summarizes pressures detected at the respective measuring points based on alteration in current or resistance of each exciting coil 2.

The sensor controlling unit 16 is a processing unit that controls, for example, timing of voltage application to each exciting coil 2 on the sensor sheet 1 or controls the frequency of the voltage based on the sensor control information 15a in the storage unit 15. Also, the analyzing unit 16b is a processing unit that summarizes pressures detected at the respective exciting coils 2 and outputs the results to the displaying unit 14. At this analyzing unit 16b, noise included in the output results from the exciting coils 2 may be filtered, or a correction process, such as temperature correction, may be performed.

Figure 7:
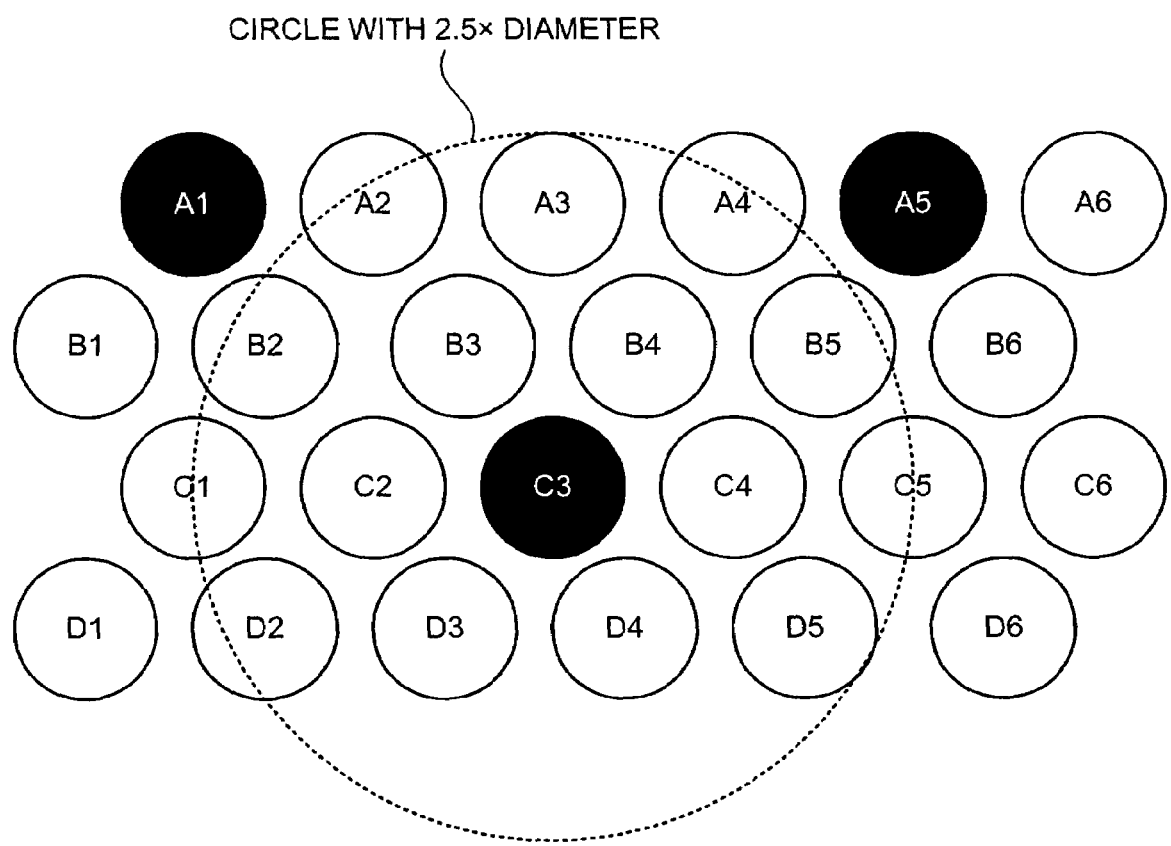
FIG. 7 is a view depicting one example of exciting timing of the exciting coils.

Next, voltage application timing control performed by the sensor controlling unit 16 will be described with reference to FIG. 7. FIG. 7 is a view depicting one example of exciting timing of the exciting coils 2. Each circle depicted in the drawing represents the exciting coil 2. Symbols in each circle, such as "A1", are identification signs for identifying each exciting coil 2.

As depicted in the drawing, on the coil layer 1c of the sensor sheet 1, the exciting coils 2 are arranged in an array. When voltage is applied to an exciting coil 2 of "C3", an eddy current is induced on the metal layer 1a due to excitation of the exciting coil 2. The influence of this eddy current extends to exciting coils 2 near the exciting coils 2 of "C3". Therefore, when voltage is applied to all of the exciting coils 2 simultaneously, an error occurs in the detected pressure data due to mutual interference of the exciting coils 2.

In order to address this problem, in the pressure measuring device 10 according to the second embodiment, the sensor controlling unit 16 shifts the timing of exciting the exciting coils 2, thereby suppressing the error described above. Since the influence when voltage is applied to one exciting coil 2 extends to approximate twice the diameter of the exciting coil 2, it is preferable not to simultaneously apply voltage to the exciting coils 2 within a range 2.5 times of the diameter, as depicted in a circle indicated by a broken line in the drawing.

As for the case depicted in FIG. 7, voltage may be simultaneously applied to exciting coils 2 of "A1", "C3", and "A5", but may not be simultaneously applied to exciting coils 2 adjacent to each other, such as those of "C3" and "A3". The sensor controlling unit 16 controls such exciting timing based on the sensor control information 15a in the storage unit 15.

Figure 8:
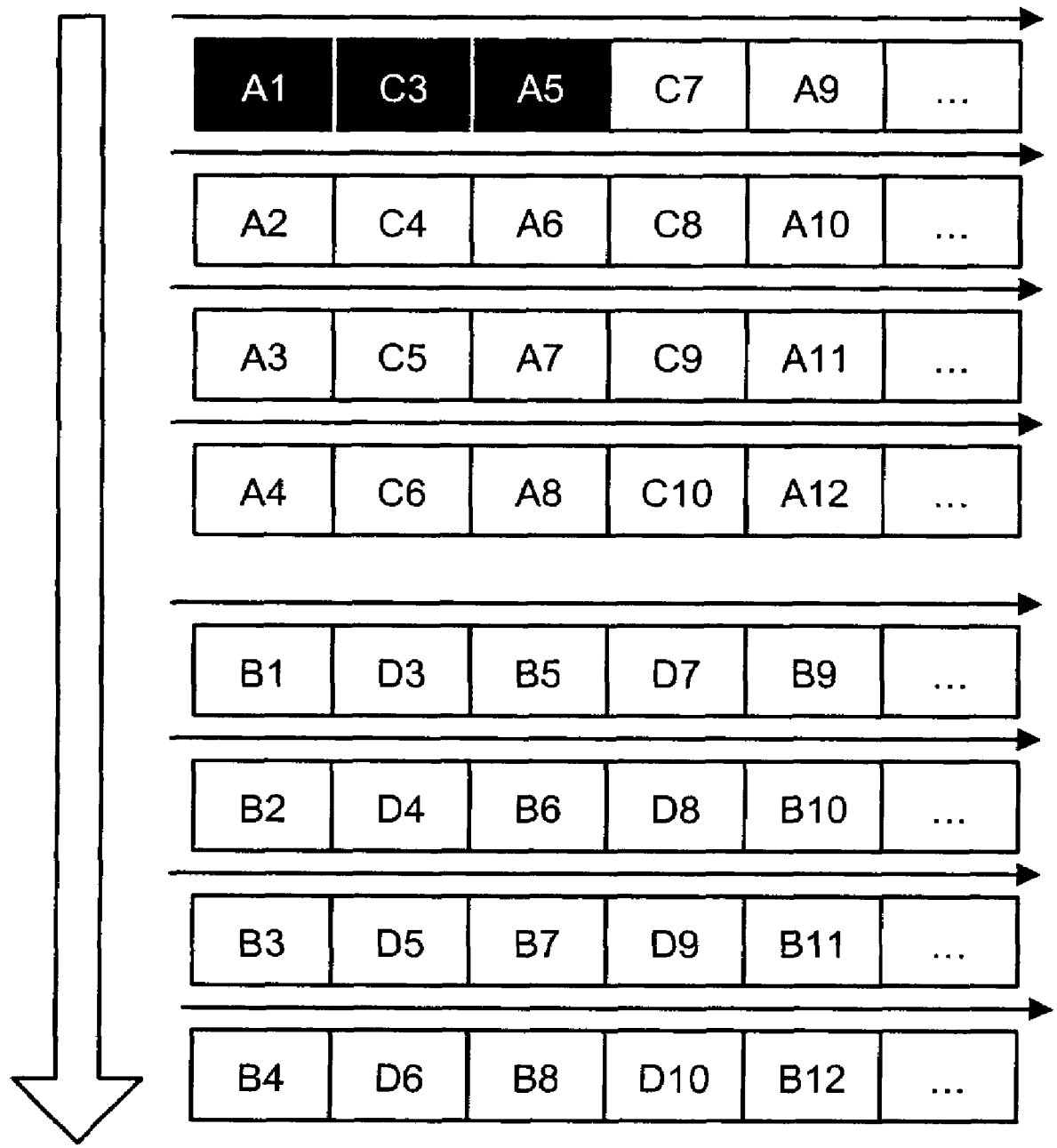
FIG. 8 is a view depicting one example of exciting order of the exiting coils.

Next, an example of the sensor control information 15a in the storage unit 15 is described by using FIGS. 8 and 9. FIG. 8 is a drawing of one example of an exciting order of the exiting coils 2. FIG. 9 is a table listing examples of a voltage frequency applied to the exciting coils 2. As depicted in FIGS. 8 and 9, the sensor control information 15a is information containing exciting timing and frequencies of applied voltage to the exciting coils 2. In the example described in the second embodiment, the sensor controlling unit 16a controls the excitation of the exciting coils 2 based on the sensor control information 15a, although excitation may be controlled by using a predetermined electronic circuit.

Each row depicted in FIG. 8 represents exciting coils 2 to which voltage are applied simultaneously. As indicated by a downward-pointing arrow in the drawing, after the sensor controlling unit 16a receiving this information has applied voltage to the exciting coils 2 on the first line and a predetermined time has elapsed, the sensor controlling unit 16 applies voltage to the exciting coils 2 on the second line. By repeating a similar process, excitation of all of the exciting coils 2 included in the sensor sheet 1 is performed. The exciting coils 2 included in each row may be successively excited (at predetermined intervals) in an order indicated by rightward-pointing arrows in the drawings.

Also, as depicted in FIG. 9, information in which groups of exciting coils 2 as targets for voltage application and frequencies of the applied voltages are associated may be included in the sensor control information 15a, thereby making it possible to change the detection sensitivity of the sensor per each predetermined area on the sensor sheet 1.

For example, a frequency of a voltage applied to exciting coils 2 with their numbers ending in "1 to 2" is registered as "XX" Hz, and a frequency thereof with their numbers ending in "3 to 4" is registered as "YY" Hz. With this, the detection sensitivity of the sensor can be changed for each rectangular area on the sensor sheet 1. By merely changing the information depicted in FIG. 9, the patterns 5a and 5b depicted in FIGS. 5A and 5B can be achieved.

As described above, in the second embodiment, a pressure measuring device using the sensor sheet described in the first embodiment is configured and, based on the sensor control information in the storage unit, the sensor controlling unit controls exciting timing of each exciting coil on the sensor sheet and also control frequency of applied voltage. The device is configured such that the analyzing unit summarizes pressure data detected at each exciting coil for display on the displaying unit. Therefore, by merely changing the sensor control information, the pressure detection sensitivity of a predetermined area on the sensor sheet can be changed, and also accurate pressure data can be obtained by precluding the influence among the exciting coils.

Finally, measurement targets of the pressure sensor (sensor sheet) 1 and the pressure measuring device 10 will be described with reference to FIG. 10. FIG. 10 is a table listing examples of measurement targets of the pressure sensor 1 and the pressure measuring device 10. As depicted in the table, if the sensor sheet 1 is mounted on a mattress of a medical bed, the surface pressure of a sleeping person can be measured.

As described above, since the sensor sheet 1 has flexibility, even if it is mounted on the mattress, the cushion property of the mattress is not reduced. In this manner, the sensor sheet 1 is useful if used for a medical bed to prevent inpatients from having bedsores. The sensor sensitivity can be easily changed for each of areas, such as the head and legs.

Furthermore, if the sensor sheet 1 is mounted as sock linings in shoes, the pressure of a sole can be measured. For example, the sensor sheet 1 is used at the time of fitting for ski boots, by which appropriate settings for each user can be easily achieved.

Still further, by mounting the sensor sheet 1 on a rubber surface of a wiper of an automobile or the like, a test for measuring a degree of adhesion between the wiper and the windshield can be easily performed. On the other hand, by mounting the sensor sheet 1 on a windshield side, a wiper optimally fitting to the windshield can be easily developed.

Still further, if the sensor sheet 1 is mounted on a constructional material or the like, joint pressure with another constructional material can be measured. In this manner, the sensor sheet 1 according to the present invention can be mounted on various targets, and the sensor sensitivity can be freely changed for each area on the single sensor sheet 1. Therefore, the sensor sheet 1 can flexibly adapted to measurement purposes.

In the embodiments discussed above, the pressure sensor formed of the metal layer, the elastic member layer, and the coil layer has been described. Alternatively, this pressure sensor may be used as a displacement sensor or a weight sensor.

As has been described in the foregoing, the pressure sensor and the pressure measuring device using this pressure sensor are useful for measuring pressure of various measurement targets and, in particular, are suitable when a surface pressure is desired to be accurately measured.

While the invention has been described with reference to the exemplary embodiments, it should be appreciated that various changes and modification examples can be easily provided by those skilled in the art without departing from the spirit of the present invention. Therefore, the above disclosure is to be construed only for the purpose of description, and is not to be construed as being restrictive. The present invention is restricted only by the entire scope of the following claims and their equivalents.

What is claimed is:

1. A pressure sensor comprising:
   a coil layer including an exciting coil;
   an elastic member layer made of a non-metal material provided directly adjacently to the coil layer; and
   a metal layer made of a metal film provided adjacently to the elastic member layer,
   the coil layer, the elastic member layer and the metal layer being laminated together, wherein
   a pressure applied to the metal layer is detected based on a change in an eddy current induced by the exciting coil on the metal film.

2. The pressure sensor according to claim 1, wherein
   the coil layer includes a plurality of the exciting coils arranged in an array, and
   a surface pressure applied to the metal layer is detected.

3. The pressure sensor according to claim 1, wherein
   the coil layer includes a plurality of the exciting coils, wherein number of turns, diameter or both of the exciting coils varies per each predetermined area.

4. The pressure sensor according to claim 1, wherein
   the elastic member layer is made of a non-metal materials, wherein elastic modulus of the material varies per each predetermined area.

5. The pressure sensor according to claim 1, wherein
   the elastic member layer is made of polyurethane.

6. The pressure sensor according to claim 1, wherein
   the coil layer, the elastic member layer, and the metal layer have flexibility applicable to a measurement target or a mounting target.

7. A pressure measuring device comprising:
   a pressure sensor formed by of a laminate including:
      a coil layer including a plurality of exciting coils arranged in an array;
      an elastic member layer made of a non-metal material provided directly adjacently to the coil layer; and
      a metal layer made of a metal film provided adjacently to the elastic member layer; and
   a voltage applying unit that applies a voltage to each exciting coil of the pressure sensor with predetermined time differences.

8. The pressure measuring device according to claim 7, wherein
   the coil layer of the pressure sensor includes a plurality of the exciting coils having different number of turns, diameter or both.

9. The pressure measuring device according to claim 7, wherein
   the elastic member layer of the pressure sensor is made of non-metal materials, wherein elastic modulus of the material varies per each predetermined area.

10. The pressure measuring device according to claim 7, wherein
    voltages of frequencies are applied to the exciting coils, wherein the voltages vary depending on predetermined areas to which the coils are provided.

11. The pressure measuring device according to claim 7, wherein as a voltage is applied to one selected exciting coil of the exciting coils, no voltage is applied to any other of the exciting coils within a range of 2.5 times diameter of the one selected exciting coil.

* * * * *